(12) United States Patent  
Gaboury (10) Patent No.: US 6,241,171 B1  
(45) Date of Patent: Jun. 5, 2001

(54) LEADERLESS TAPE DRIVE

(75) Inventor: David E. Gaboury, Worcester, MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/048,929

(22) Filed: Mar. 26, 1998

(51) Int. Cl.[7] .................................................. G11B 15/66
(52) U.S. Cl. .................................. 242/332.8; 242/332.7; 242/587.1; 242/587.2
(58) Field of Search ............................ 242/332.4, 332.7, 242/332.8, 532.4, 532.6, 584.1, 587.2, 587.1, 586.6

(56) References Cited

U.S. PATENT DOCUMENTS

| | | | |
|---|---|---|---|
| 2,022,807 | * 12/1935 | Hagerty | 242/586.6 |
| 3,589,637 | * 6/1971 | Wagner | 242/332.7 |
| 3,740,001 | * 6/1973 | Wroblewski | 242/332.7 |
| 3,794,254 | 2/1974 | Tarasenko et al. . | |
| 3,797,776 | 3/1974 | Umeda et al. . | |
| 4,662,049 | 5/1987 | Hertrich | 29/267 |
| 4,679,747 | * 7/1987 | Smith | 242/332.4 |
| 4,720,913 | 1/1988 | Hertrich | 28/819 |
| 5,173,828 | 12/1992 | Tanzer et al. | 360/130.21 |
| 5,216,556 | 6/1993 | Steinberg et al. | 360/74.3 |
| 5,414,585 | 5/1995 | Saliba | 360/130.21 |
| 5,634,609 | * 6/1997 | Glover et al. | 242/348.1 |

* cited by examiner

Primary Examiner—John Q. Nguyen  
(74) Attorney, Agent, or Firm—Steven G. Roeder (57) ABSTRACT

A tape drive wherein a tape leader from a tape cartridge is urged through a tape path, into a take-up reel, and secured therein without the use of a buckling mechanism or a take-up leader. The take-up reel includes a locking slot defined along the central hub for receiving and locking the leader thereto. As the tape cartridge is inserted into the tape drive, an idle roller moves into position to push the leader against a motorized roller, pinching the tape leader therein between. As the motorized roller rotates, friction between the leader and rollers urges the leader through the tape path and into the take-up reel locking slot. A slight predetermined rotation of the take-up reel secures the leader with a locking member further defined within the locking slot.

17 Claims, 8 Drawing Sheets

LEADERLESS TAPE DRIVE

FIELD OF THE INVENTION

This invention relates generally to magnetic tape recording. More particularly, it relates to a tape drive having an assembly that eliminates the conventional buckling process, including a buckling mechanism and a take-up leader.

BACKGROUND OF THE INVENTION

Figure 1:
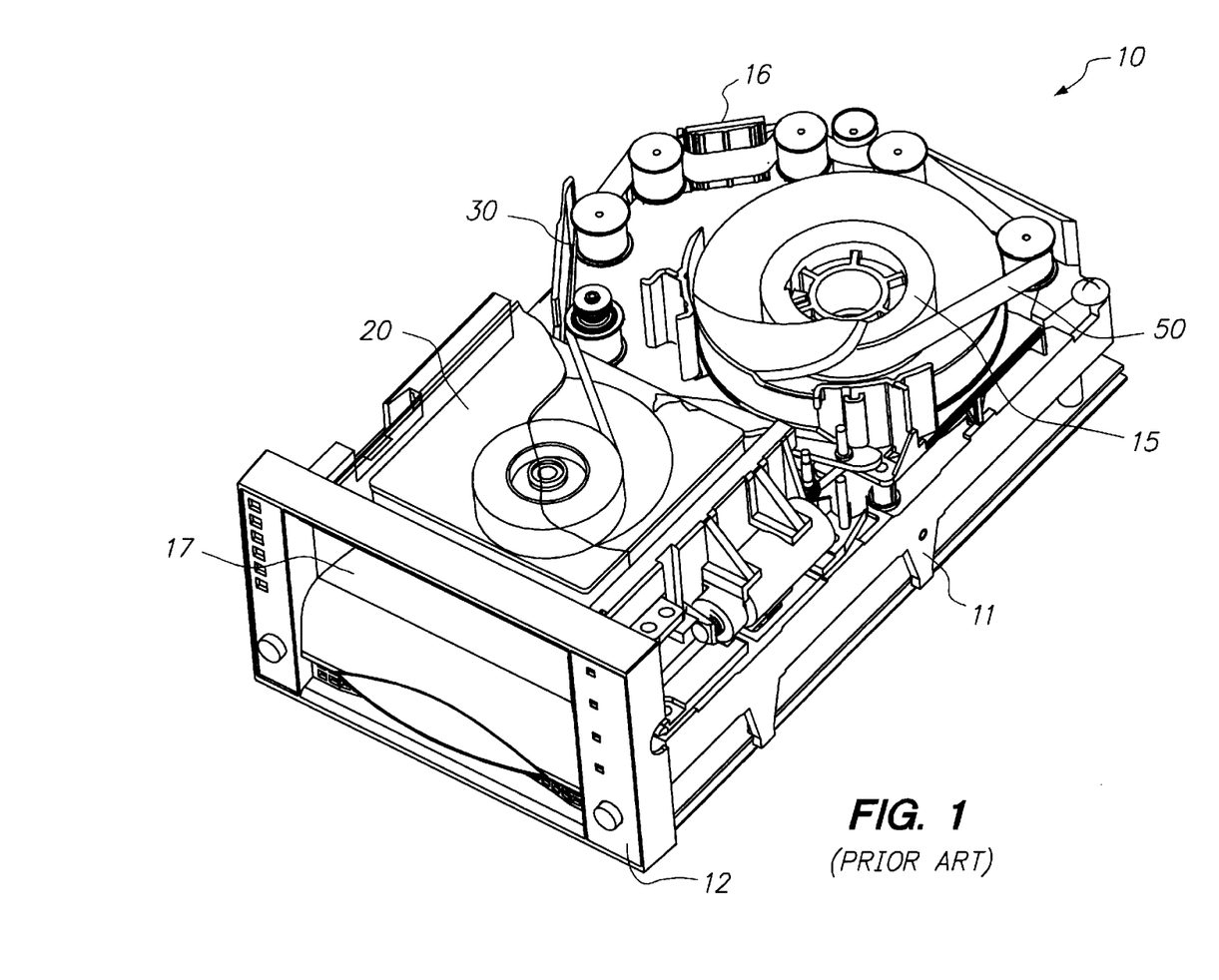
FIG. 1 is a plan view of a prior art tape drive.

The constantly increasing operational speeds of digital computers are creating a demand for corresponding increases in the data storage capacities of magnetic tape recording and reproducing systems, while maintaining the special requirements of high speed digital tape systems. As shown in FIG. 1, a typical single reel magnetic tape drive 10 includes a baseplate 11, a take-up reel 15, a take-up leader 50 attached thereto, a read/write head 16, control circuits (not shown), and an opening 17 defined in a face plate 12 for receiving a tape cartridge 20. In FIG. 1, the tape drive 10 is shown with the tape cartridge 20 and the take-up leader 50 being buckled to a tape leader 30. In addition, an enclosure covering the top of the drive 10 is removed in FIG. 1 to show the internal components described above.

Figure 2A:
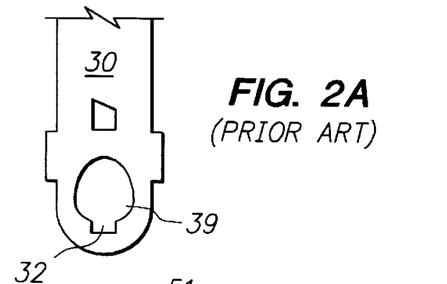
FIG. 2a is a top view in elevation of a section of a prior art tape leader.
Figure 2B:
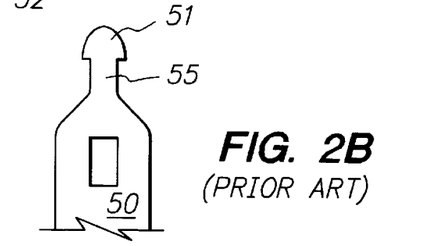
FIG. 2b is a top view in elevation of a section of a prior art take-up leader.

By way of example, a section of a typical take-up leader 50 is shown in FIG. 2b. The take-up leader 50 includes a nose 51 and neck 55 defined at one end while the other end of the take-up leader 50 is attached to the take-up reel 15.

A typical tape cartridge includes a housing, a supply reel, and a fixed length of magnetic data storage tape attached thereto. A tape leader 30 is attached at one end of the data storage tape while the other end of the tape is attached to the supply reel hub. The cartridge is inserted into the tape drive to store the desired information thereon, and removed and stored in a secure location. A tape cartridge is typically four and one-tenth inches square and one inch high. FIG. 2a shows a typical tape leader 30 including a tape leader hoop 39. The hoop 39 includes a notch area 32. The hoop 39 is dimensioned to enable the take-up leader nose 51 and a take-up leader neck 55 to pass therethrough. The notch area 32 is further dimensioned to enable the neck 55 to pass therethrough, but prevent the nose 51 from passing therethrough. Thus, in a "buckled" position, the nose 51 is locked against the notch area 32.

Figure 3:
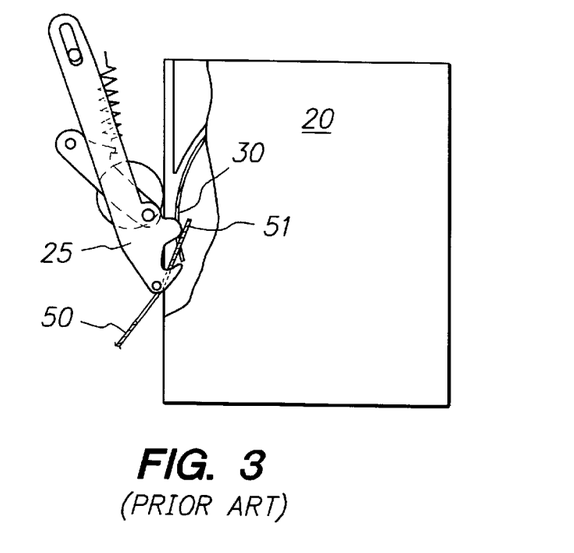
FIG. 3 represents a prior art buckling mechanism buckling a take-up leader to a tape leader as a tape cartridge is inserted into a tape drive.

As an example, FIG. 3 represents a typical buckling process wherein, as a cartridge 20 is inserted into a tape drive, the tape leader 30 and take-up leader 50 are buckled by a buckling mechanism 25. The process of buckling/unbuckling the take-up leader 50 with the tape leader 30 is described in detail in commonly assigned U.S. patent application Ser. No. 08/666,854 and is incorporated herein by reference. In addition, commonly assigned U.S. Pat. Nos. 4,662,049 and 4,720,913 provide examples of prior tape buckling arrangements and structures. The contents of which are also incorporated herein by reference.

Unsuccessful buckling is a costly source of drive failure. Two of the more common buckling failure modes are "leader runaway" and "half-buckling". Leader runaway occurs when the leaders are not completely locked, and the take-up leader unbuckles before the tape leader has been pulled into the take-up reel. Half-buckling occurs when only one ear of the take-up leader nose engages and locks to the tape leader hoop and often results in leader runaway. Leader runaway is a failure that cannot be fixed by the end user and requires the tape drive to be returned to the drive manufacturer for repair. Causes of buckling related drive failures are commonly related to the buckling mechanism design and/or the integrity of the take-up leader.

Thus, there exits a hitherto unsolved need for an improved, simple and cost efficient tape drive assembly for coupling a tape leader to a tape drive take-up leader that eliminates the use of a buckling mechanism and take-up leader, thereby eliminating the possibility of buckling related drive failures.

SUMMARY OF THE INVENTION WITH OBJECTS

A general object of the present invention is to provide an improved tape drive that overcomes limitations and drawbacks of the prior art by eliminating the use of a conventional take-up leader and buckling mechanism.

More specifically, it is an object of the present invention to provide a tape drive with a take-up reel having features enabling a tape leader to be coupled and locked thereon as well as features enabling the tape leader to be transferred from a tape cartridge to the take-up reel.

It is also an object of the present invention to provide a method for urging a tape cartridge tape leader through a tape drive tape path and into locking engagement with a tape drive take-up reel without the use of conventional take-up leader and conventional buckling mechanism.

In accordance with principles of the present invention, a leaderless tape drive includes a take-up reel having a locking slot for locking a tape leader thereon and rollers for feeding the tape leader from the cartridge through an enclosed tape path and into a locking position with the take-up reel. A leader guide end member and the enclosed tape path ensure that the tape leader is transferred from the cartridge to the take-up reel despite the possibility of leader curl. As a cartridge is inserted into the tape drive, the tape leader is presented in position to be pinched between a motorized roller and an idle roller. As the motorized roller rotates, the idle roller rotates in concert to urge tape leader through the tape path and into the locking slot of take-up reel. Motorized roller stops when a sensor, located adjacent the leader guide end member, senses an indicator (e.g. magnetic indicator), signifying that the tape leader is in position to be locked with take-up reel. A predetermined rotation of take-up reel engages a locking member, defined on the take-up reel hub, with tape leader.

These and other advantages of the present invention will become apparent upon reading the following detailed descriptions and studying the various figures of the drawings.

BRIEF DESCRIPTION OF THE DRAWINGS

FIG. 4b is a top view in elevation of the take-up reel shown in FIG. 4a.

DETAILED DESCRIPTION OF THE PREFERRED EMBODIMENTS

The present invention described herein relates to a tape drive. In the following description, numerous specific details are set forth in order to provide a thorough understanding of the present invention. It will be apparent, however, to one skilled in the art, that the present inventions may be practiced without some or all of these specific details. In other instances, well known structures and/or process steps have not been described in detail in order not to unnecessarily obscure the present invention.

Figure 4A:
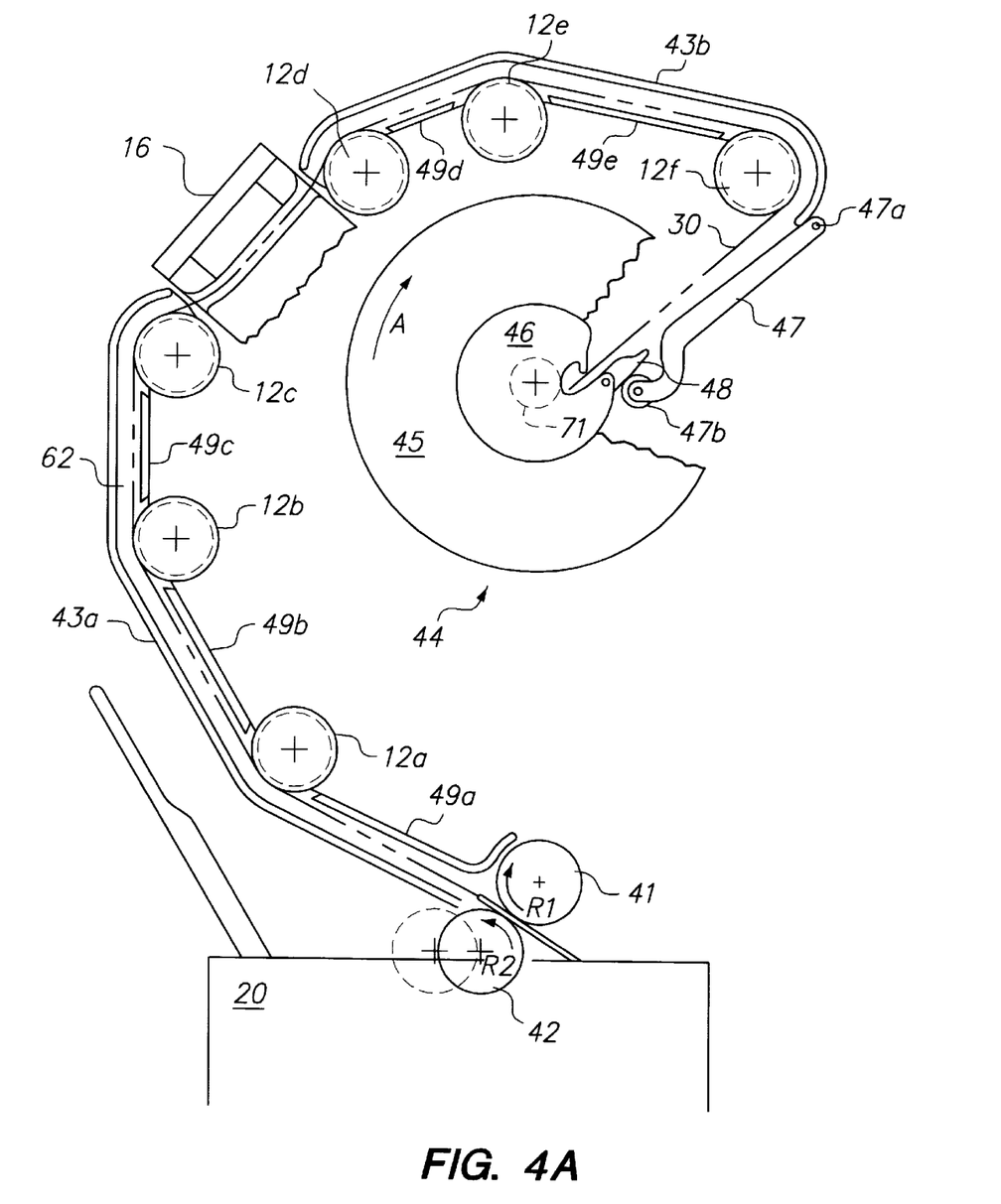
FIG. 4a represents a leaderless tape drive in accordance with principles of the present invention.

FIG. 4a is a simplified representation of a tape drive, illustrating the components that are particularly significant to the present invention, including a tape cartridge 20 inserted therein.

As shown, the present invention includes a take-up reel 44, a plurality of roller tape guides 12, a read/write head 16, leader feeding rollers 41 and 42, tape guides 43a and 43b and tape guide end 47.

Figure 4B:
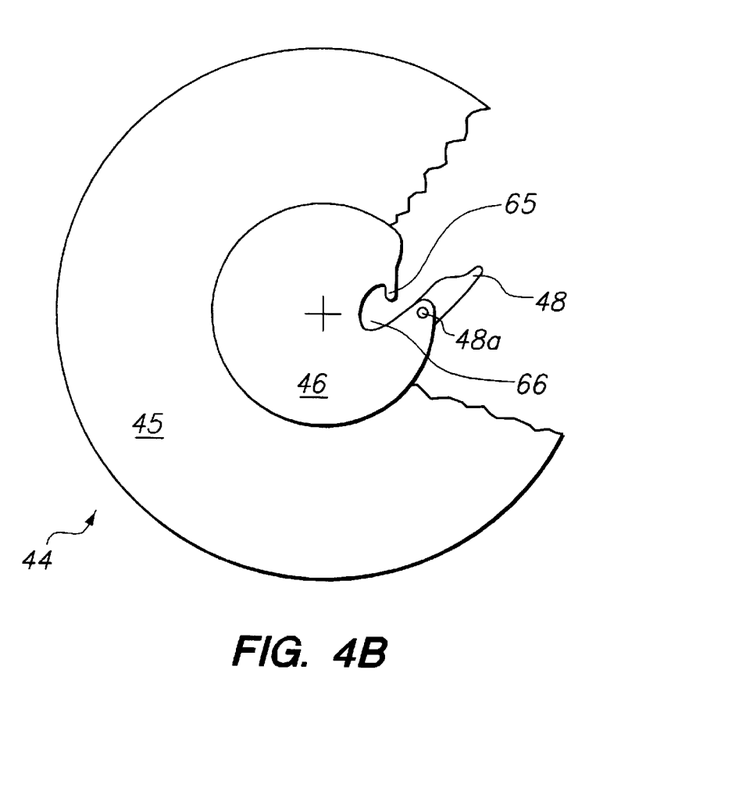

As shown in the cutout view of FIG. 4b, take-up reel 44 includes radial flanges 45, which extend radially from each end of a central hub 46. Take-up reel motor 71 engages and drives take up reel 44 in the direction shown by arrow A to transfer the tape from tape cartridge 20 to take-up reel 44 once a cartridge has been inserted. In addition, a supply reel motor (not shown) engages and drives a supply reel in tape cartridge 20 to transfer the tape from the take-up reel 44 back into the cartridge 20. Proper balance of the opposing torque of the two motors produces the required tension and also produces tape motion either in or out of cartridge 20. The motors associated with reels are driven by a motor control circuit (not shown) such as the circuit described in commonly assigned U.S. Pat. No. 5,216,656 for "Method for Optimized Tape Tension Adjustment for a Tape Drive", the disclosure thereof being incorporated herein by reference.

A spring loaded arm 48 pivots about a pivot point 48a, located on hub 46. Arm 48 is shown in an unbiased ("home") position. As will be explained below, arm 48 is biased into a "closed" position as tape is wound around take-up reel 44. Take-up reel 44 also includes a locking slot 66 defined on the hub 46 and adjacent arm 48. Locking slot 66 is dimensioned to receive tape leader 30, enabling a leader-locking member 65, defined preferably as shown in FIG. 4b, to engage and lock onto leader hoop 39.

In the embodiment of FIG. 4a, a tape path 62 is defined by six-roller tape guides 12a,b,c,d,e,f and tape guide end 47 which provide the path for the tape to travel from the cartridge supply reel, across the read/write head 16, and onto take-up reel 44. It is conventionally necessary to constrain the tape 35 against lateral movement as it traverses a face of the read/write head 16 in order to keep the parallel data tracks defined on tape 35 in alignment with transducing elements defined about the head 16. Accordingly, a preferred embodiment of six roller tape guides is used to constrain 0.5 inch wide tape (of predetermined thickness) in place across the head 16. Presently preferred embodiments of the rollers 12a,b,c,d,e,f are set forth in commonly assigned U.S. Pat. No. 5,173,828 for "Compact Multiple Roller Tape Guide Assembly" and in commonly assigned U.S. Pat. No. 5,414,585 for "Rotating Tape Edge Guide", the disclosures thereof being incorporated herein by reference.

As shown in FIG. 4a, the tape path 62 is further defined by a plurality of tape path guides 49a,b,c,d,e. Each of the tape path guides 49a,b,c,d,e is defined between adjacent roller tape guides 12a,b,c,d,e,f on the opposite side of the tape leader guides 43a and 43b. Thus, tape path guides 49a,b,c,d,e, leader guides 43a and 43b and tape guide end 47, together, provide an enclosed tape path which prevents the tape leader from straying away from the tape path 62 during tape loading. Typically, leader guides 43a and 43b as well as tape path guides 49a,b,c,d,e may be made from polycarbonate or other suitable material and are rigidly attached to the drive 10 using conventional means such as screws, or other suitable means. Those skilled in the art will understand that the shape of leader guides 43a,b and the number of tape path guides 49a,b,c,d,e will depend on drive design factors such as the number of roller tape guides and the actual layout of the roller tape guides.

Figure 5:
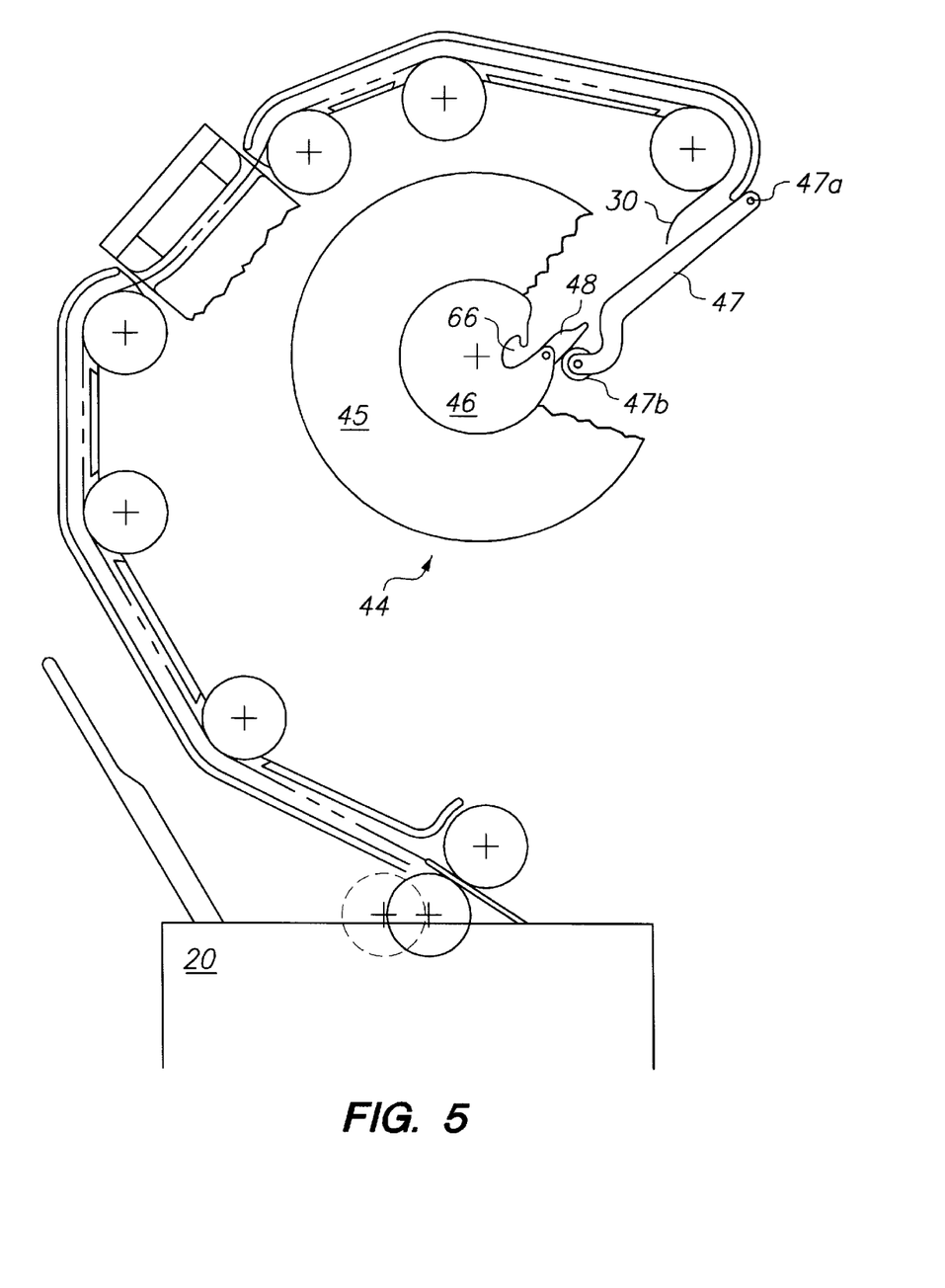
FIG. 5 represents the tape drive of FIG. 4a showing the tape leader prior to insertion into take-up reel.
Figure 6:
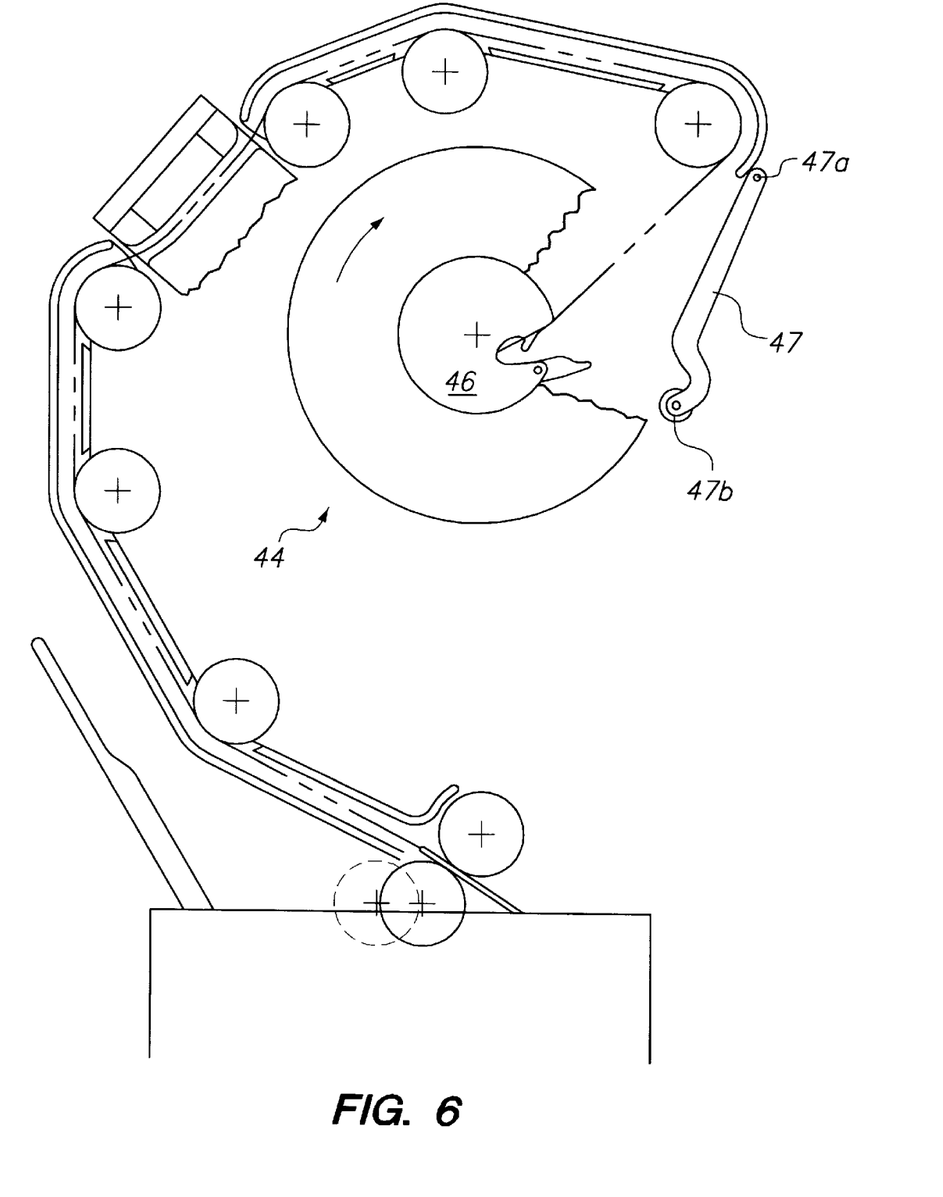
FIG. 6 represents the tape drive of FIG. 4a showing a preferred position of the leader guide end after the take-up reel locking member engages take-up leader.
Figure 7:
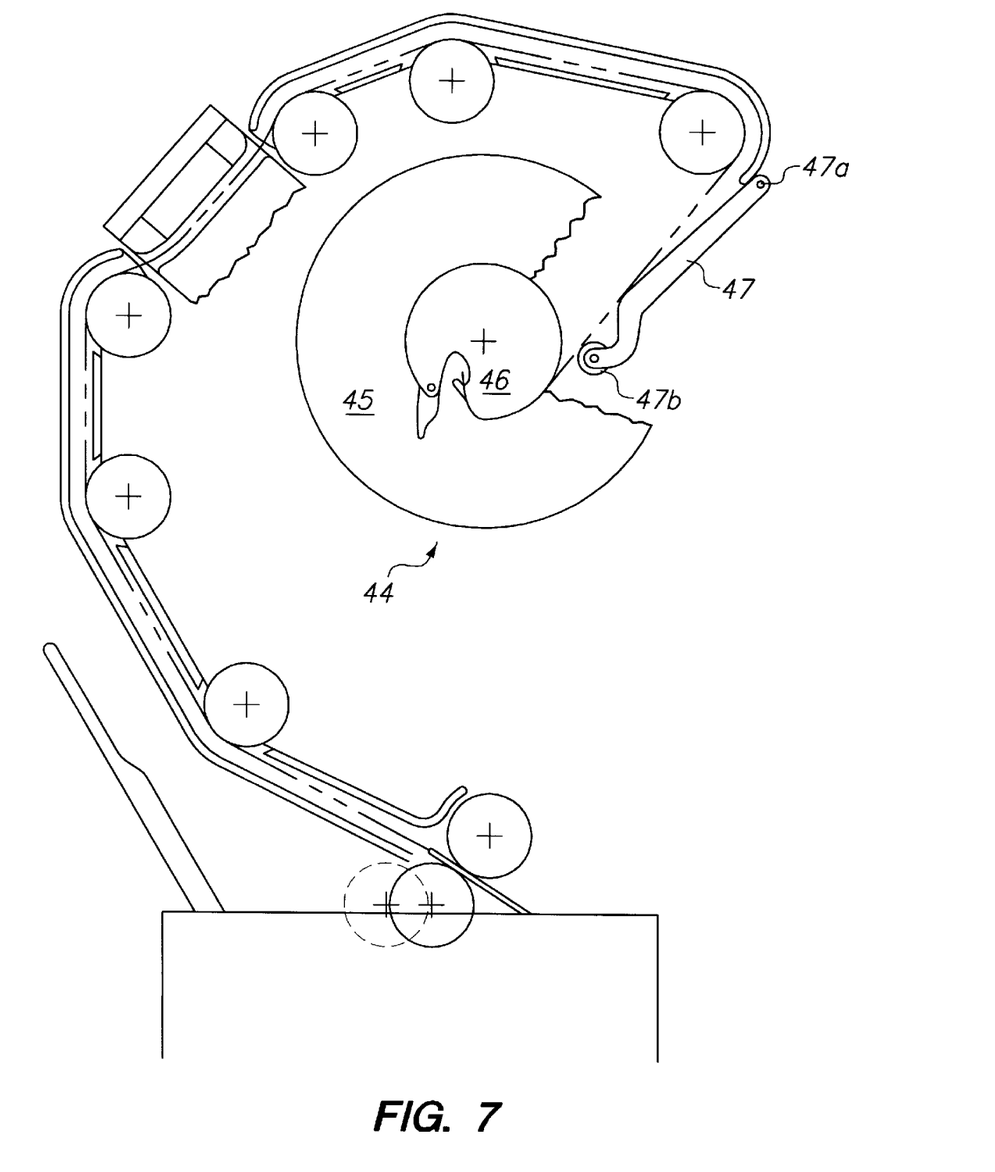
FIG. 7 represents the tape drive of FIG. 4a showing an alternative position of the leader guide end after the take-up reel locking member engages take-up leader.

Since tape leader 30 may curl in the manner shown in FIG. 5, from being wound and stored in tape cartridge 20, it is possible that leader 30 may veer away from tape path 62 during tape loading, after passing roller tape guide 12f. Accordingly, leader guide end 47 is provided to prevent such an occurrence and enable tape leader 30 to be successfully fed into take-up reel locking slot 66 during the loading operation. Tape guide end 47 is pivotably biased about one end 47a and includes a roller 47b rotatably defined about the other end. Roller 47b rests on arm 48 when tape is removed from take-up reel 44, as shown in FIG. 5. As tape is wound onto take-up reel 44, leader guide end 47 preferably is biased into a position shown in FIG. 6, i.e. away from the take-up reel hub 46. Those skilled in the art will understand that the leader guide end 47 may be biased into this position by various known methods e.g. a mechanical arm or a motor coupled to end 47a. Alternatively, roller 47b may remain in biased contact against the tape as the tape is wound on take-up reel 44, as shown in FIG. 7. As tape is unwound from take-up reel 44, leader guide end 47 is driven back to the "home" position shown in FIG. 5.

As shown in FIG. 4a, motorized roller 41 and idle roller 42 provide mechanical means for urging the tape leader 30 from the cartridge 20 to take-up reel 44, once the cartridge 20 is inserted into tape drive 10. Preferably, but not necessarily, a motor (not shown) drives roller 41 while roller 42 remains idle. As shown in FIG. 4a, roller 42 moves between a first ("home") position (represented by a dotted line) and a second position (represented by a solid line). When tape cartridge 20 is inserted into tape drive, roller 42 moves from the first position to the second position, pushing tape leader 30 against roller 41, such that tape leader 30 is pinched therein between. As roller 41 is driven into rotation in the direction shown by the arrow R1, idle roller 42 correspondingly rotates in an opposite direction, as shown by arrow R2, to urge tape leader 30 through tape path 62 and into take-up reel 44.

Figure 8:
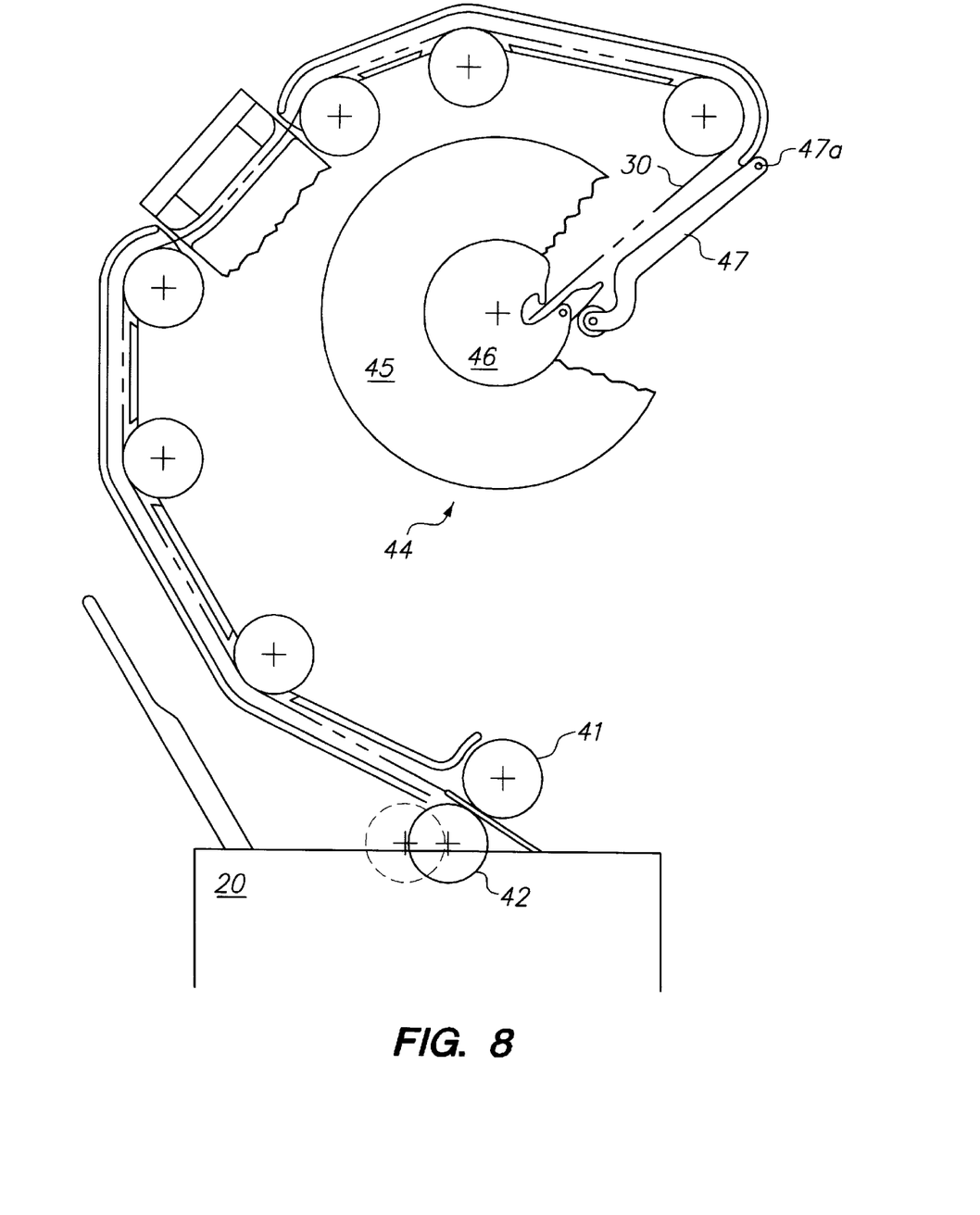
FIG. 8 represents the tape drive of FIG. 4a showing the position of the tape leader prior to rotation of take-up reel.
Figure 9:
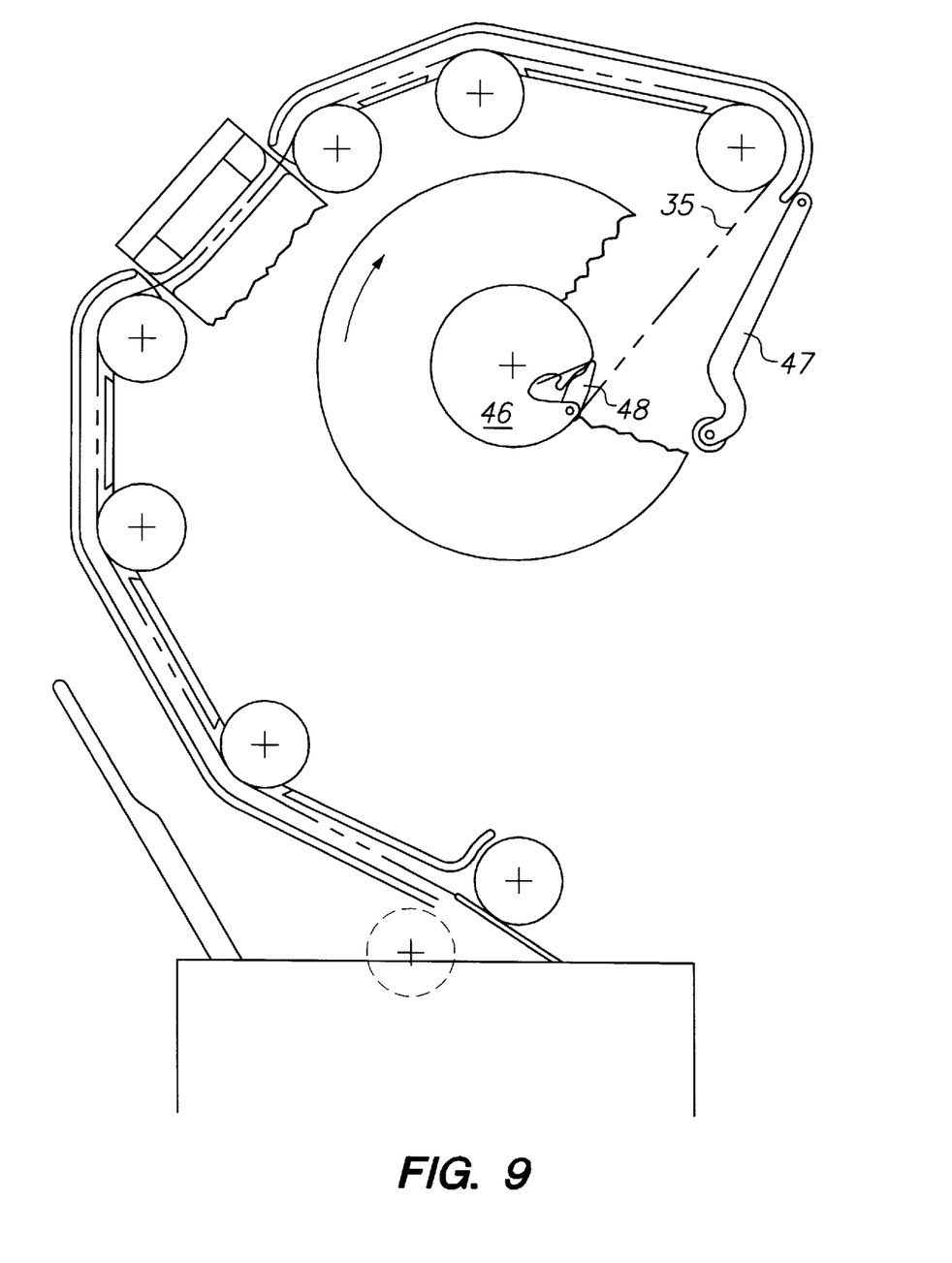
FIG. 9 represents the tape drive of FIG. 4a showing the position of a spring loaded arm as tape is wound onto take-up reel.

As tape leader 30 enters locking slot 66, a magnetic sensor located in proximity to leader guide end 47 senses an indicator (not shown) defined on the leader 30. The motor driving roller 41 is then turned off, stopping further advancement of the tape leader 30, thereby enabling the tape leader 30 to always stop at the same position (represented in FIG. 8) relative to the take-up reel 44. At this point, roller 42 returns to the home position and roller 41 is freely rotatable. Take-up reel motor 71 then drives take-up reel 44 to rotate a predetermined radian, in the direction shown by the arrow of FIG. 6, such that locking member 65 engages and locks onto leader hoop 39. As take-up reel 44 continues to wind tape thereon, the tension of the tape 35 overcomes the spring constant of arm 48 such that arm 48 is pivoted against hub 46 as shown in FIG. 9.

In general, the tape 35 may be driven in either forward direction or backward direction to write data onto selected track locations, or to read data from selected data track locations.

During an unloading process, supply reel motor (not shown) drives supply reel and transfers the tape 35 from take-up reel 44 back onto the supply reel. As tape leader 30 unwinds from take-up reel, arm 48 and tape guide end 47 return to their respective "home" positions. During the unload process, roller 41 remains idle while roller 42 remains in the "home" position, i.e. away from the tape 35. The tape 35 is rewound back onto the supply reel before tape cartridge 20 may be released and withdrawn from the tape drive 10.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A tape drive for receiving a cartridge, the cartridge including a tape leader, the tape drive comprising:
   a baseplate;
   a take-up reel including a hub rotatably mounted to the baseplate, a spring loaded arm pivotably mounted to the hub and a leader locking means, the leader locking means including a locking member defined within a locking slot defined on the hub, the locking member being defined to receive a tape leader hoop of the tape leader, the arm securing the tape leader into locked engagement with the locking slot;
   a tape leader guiding means for guiding the tape leader from near the cartridge to near the take-up reel; and
   a leader urging mechanism for urging the tape leader from near the cartridge to near the take-up reel.

2. The tape drive of claim 1 further comprising:
   a read/write head;
   a plurality of roller tape guides mounted to the baseplate; and
   a tape guide end that pivots relative to the take-up reel.

3. The tape drive of claim 2 wherein the pivotable tape guide end comprises an elongated member to guide the tape leader from one of the plurality of roller tape guides to the take-up reel.

4. The tape drive of claim 2 wherein the tape guide end is pivoted by a motor.

5. The tape drive of claim 1 wherein the locking member is dimensioned to engage and couple the tape leader hoop.

6. The tape drive of claim 1 wherein the leader urging mechanism comprises a first roller and a second roller, each roller being rotatably mounted to the baseplate at a position to pinch the tape leader as the cartridge is inserted into the tape drive.

7. The tape drive of claim 6 wherein the first roller is driven by a motor.

8. The tape drive of claim 7 wherein the second roller is moveable between a first position in which the second roller is positioned away from the first roller and a second position in which the second roller is positioned near the first roller.

9. The tape drive of claim 8 wherein the second roller is moved to the second position after the tape cartridge is inserted into the tape drive, thereby pushing the tape leader against the first roller.

10. A take-up reel for a tape drive that receives a tape cartridge, the tape cartridge including a tape leader, the take-up reel comprising:
    a hub including a pair of ends;
    a locking slot defined within the hub for receiving and securing the tape leader;
    two flanges, each flange extended radially from each end of the hub;
    a spring biased arm pivotably mounted to the hub, the arm securing the tape leader into locked engagement with the locking slot; and
    a locking member defined within the locking slot for coupling the tape leader.

11. A tape drive for receiving a cartridge, the cartridge including a tape leader, the tape drive comprising:
    a baseplate;
    a take-up reel rotatably mounted to the baseplate, the take-up reel including a hub, the hub having a locking slot and a locking member positioned within the locking slot, the locking member for coupling the tape leader, the take-up reel including an arm pivotably mounted to the take-up reel, the arm selectively covering the locking slot;
    a tape leader guiding means for guiding the tape leader from near the cartridge to near the take-up reel; and
    a leader urging mechanism for pushing the tape leader from near the cartridge to near the take-up reel.

12. The tape drive of claim 11 wherein the locking member is dimensioned to engage and couple a tape leader hoop of the tape leader.

13. The tape drive of claim 11 wherein the leader urging mechanism comprises a first and second rollers, each roller being rotatably mounted to the baseplate at a position to pinch the tape leader between the rollers as the cartridge is inserted into the tape drive.

14. The tape drive of claim 13 wherein the second roller is moveable between a first position in which the second roller is positioned away from the first roller and a second position in which the second roller is positioned near the first roller.

15. The tape drive of claim 14 wherein the second roller is structured to move to the second position after the tape cartridge is inserted into the tape drive, thereby pushing the tape leader against the first roller.

16. A tape drive for receiving a cartridge, the cartridge including a tape leader having a tape leader hoop, the tape drive comprising:
    a baseplate;
    a take-up reel rotatably mounted to the baseplate, the take-up reel including a hub, the hub having a locking slot and an arm pivotably mounted to the take-up reel, the arm selectively covering the locking slot, wherein the hub includes a locking member positioned within the locking slot, the locking member being dimensioned to engage and couple the tape leader hoop of the tape leader;
    a tape leader guiding means for guiding the tape leader from near the cartridge to near the take-up reel; and a leader urging mechanism for pushing the tape leader from near the cartridge to near the take-up reel.

17. A tape drive for receiving a cartridge, the cartridge including a tape leader, the tape drive comprising:

a baseplate;

a take-up reel rotatably mounted to the baseplate;

a tape leader guiding means for guiding the tape leader from near the cartridge to near the take-up reel; and a leader urging mechanism for pushing the tape leader from near the cartridge to near the take-up reel, the leader urging mechanism including a first roller, a second roller, and a motor that rotates the one of the rollers, the second roller being moveable between a first position in which the second roller is positioned away from the first roller and a second position in which the second roller is positioned near the first roller to pinch the tape leader between the rollers; wherein the second roller is structured to move to the second position after the tape cartridge is inserted into the tape drive so that the second roller pushes the tape leader against the first roller wherein the take-up reel includes a hub, the hub having a positioned within the locking slot, the locking member being dimensioned to engage and couple a tape leader hoop of the tape leader, the take-up reel including an arm pivotably mounted to the hub, the arm selectively covering the locking slot.

* * * * *